United States Patent
Baranowski, Jr.

[15] 3,698,427
[45] Oct. 17, 1972

[54] FLUID FLOW CONTROL VALVE

[72] Inventor: Frank Baranowski, Jr., 7 Pine Street, Lynnfield Center, Mass. 01940

[22] Filed: Dec. 11, 1970

[21] Appl. No.: 97,276

[52] U.S. Cl..............137/542, 137/516.25, 251/368, 251/333
[51] Int. Cl......F16k 15/00, F16k 21/02, F16k 17/00
[58] Field of Search....137/542, 540, 516.25, 516.27, 137/516.29; 251/368, 357, 333

[56] References Cited

UNITED STATES PATENTS

| 2,845,945 | 8/1958 | Mancusi | 137/542 |
| 3,510,103 | 5/1970 | Carsello | 251/333 |
| 3,137,476 | 6/1964 | Rotheraine | 251/368 |
| 3,438,391 | 4/1969 | Yocum | 137/540 |
| 3,352,419 | 11/1967 | Entringer et al. | 251/357 |

Primary Examiner—Martin P. Schwadron
Assistant Examiner—A. M. Zupcic
Attorney—Erwin Salzer

[57] ABSTRACT

A valve including a valve element and valve stem unit is adapted to control a flow of fluid with a high degree of precision. The final configuration of the valve element is established by its engagement under pressure with the valve seat, resulting in cold flow, or creep, of the synthetic material of which the valve element is made. The valve element is joined to its stem by a screw-thread and without resorting to any adhesive bonding means.

4 Claims, 3 Drawing Figures

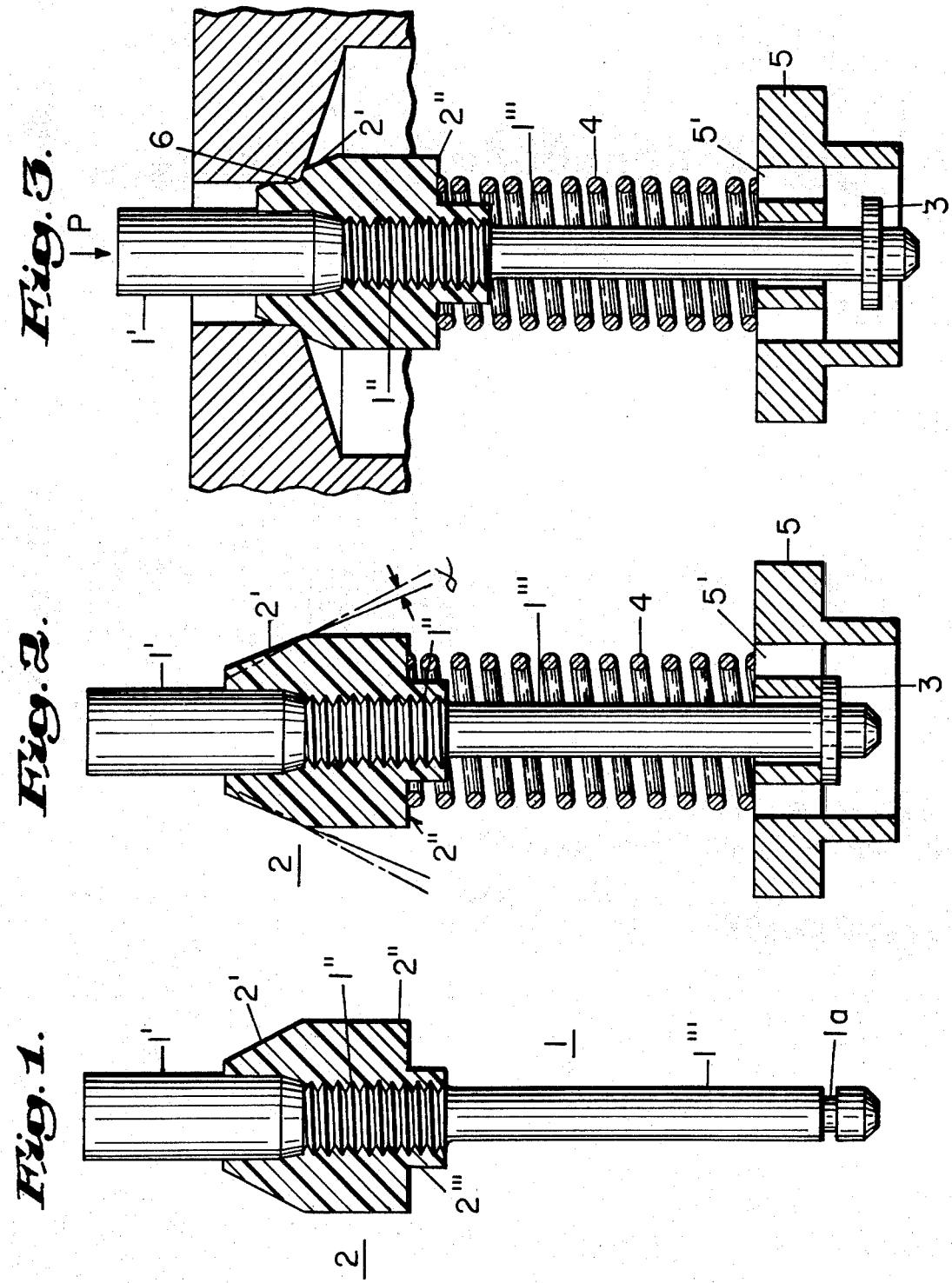

FLUID FLOW CONTROL VALVE

BACKGROUND OF INVENTION

Valve element and valve stem units intended to be used as components of pressure regulators must comply with certain requirements in addition to those normally imposed upon such units. One fundamental requirement is that the unit must be very small and light. This requirement is particularly onerous if it is intended to reduce the size of, or miniaturize, a pressure regulator. The size, or width, of various gaps formed between the valve seat and the valve element may be very small, and a gap of rigorous invariant size or width must correspond to each position of the valve element and valve seat unit. The mechanical strength of the connection between the valve element and the valve stem must be considerable to preclude relative motion between these parts under the action of strong opposite forces acting on the valve element, and on the valve stem. This requirement becomes particularly onerous if it is intended to reduce the size, or miniaturize, the valve element and valve stem unit, and if it is intended to make the valve element of a non-metallic synthetic substance for reason of greater chemical resistance.

The valve according to this invention complies with the various above referred-to requirements. It is particularly intended to be used in miniaturized pressure regulators of the type disclosed in my copending patent application Ser. No. 97,107 filed Dec. 11, 1970 for CALIBRATED PRESSURE REGULATOR, but suitable for other applications involving similar requirements.

SUMMARY OF INVENTION

A valve according to this invention includes a valve seat, a valve element, and a valve stem supporting the valve element. The valve stem has a portion of relatively large diameter positioned relatively close to the valve seat and a screw-threaded portion of relatively small diameter positioned relatively remote from the valve seat. The valve element has a valve-seat-engaging portion substantially in the shape of a frustum of a cone positioned relatively close to the valve seat and being radially expanded by said relatively large diameter portion of said valve stem. Said valve element further has a cylindrical portion positioned relatively remote from said valve seat and in mating engagement with said screw-threaded portion of said valve stem. The valve element consists of a synthetic substance having substantially the same mechanical properties as polytetrafluoroethylene. A spring biases the valve-seat-engaging portion of the valve element into engagement with the valve seat, and exerts a sufficiently high force to cause formation of a permanent sealing shoulder on said valve-seat-engaging portion of the valve element by penetration of the valve seat into the valve-seat-engaging portion of the valve element, and the resulting cold flow of said valve-seat-engaging portion of the valve element.

BRIEF DESCRIPTION OF DRAWINGS

FIG. 1 illustrates a first step in the formation of a valve embodying this invention, i.e. the combination of a valve element and a valve stem of which the former is shown in longitudinal or axial section, and the latter in front elevation;

FIG. 2 illustrates the same as FIG. 1 in the same fashion as FIG. 1 upon addition to it of a valve-element-biasing spring and a spring support; and FIG. 3 shows the same structure as FIG. 2 in the same fashion as FIG. 2 upon engagement of the valve element with a valve seat.

DESCRIPTION OF PREFERRED EMBODIMENT

Referring now to the drawings, and more particularly to FIG. 1 thereof, numeral 1 has been applied to generally indicate a valve stem. Valve stem 1 includes an upper portion 1' whose diameter is largest, an intermediate portion 1'' whose diameter is smaller than that of the upper portion 1', and the lower portion 1''' whose diameter is smaller than that of the intermediate portion 1''. The intermediate portion 1'' is screw-threaded and the major diameter of the screw-thread is less than the diameter of the upper portion 1'.

The valve element 2 includes an upper portion 2' intended to engage a valve seat, an intermediate portion 2'' which is cylindrical, and a lower portion 2''' which is also cylindrical and has a smaller diameter than the intermediate portion 2''. The upper portion 2' is in the shape of a frustum of a cone and has a coaxial bore of relatively large diameter intended to receive the upper portion of stem 1. The lower and intermediate portions 2'' and 2''' of element 2 have also a coaxial bore intended to receive the screw-threaded intermediate portion of stem 1. The valve element 2 consists of polytetrafluoroethylene, hereinafter briefly referred to as PTFE, or a synthetic substance having substantially the same mechanical properties as PTFE. PTFE is best known by its trademark TEFLON. The diameter of the bore in valve element 2 intended to receive the screw-threaded portion 1'' of valve stem 1 is slightly less than the major diameter of its screw-thread. The diameter of the bore in valve element 2 intended to receive the screw-threaded portion 1'' of stem 1 may be in the order of 0.046, inch and the major diameter of the screw-thread on stem 1 may be in the order of 0.056 inch. This results in a firm engagement between parts 1 and 2, the latter taking the shape of the screw-threaded portion 1''of stem 1. The diameter of the portion of 1' of stem 1 is likewise larger than the diameter of the bore in valve element 2 intended to receive that portion of the valve stem 1. The internal bore in the valve element 2 intended to receive the portion 1' of valve stem 1 may be in the order of 0.056 inch, and the diameter of the portion 1' of valve stem 1 may be in the order of 0.062 inch. Hence insertion of stem 1 into valve element 2 results in a radial expansion of the latter tending to increase the tight fit between stem 1 and valve element 2.

The end of stem 1 remote from the upper portion 1' thereof is provided with an annular groove 1a intended to receive a slotted fastener ring 3 shown in FIGS. 2 and 3.

In FIGS. 2 and 3 reference numeral 4 has been applied to indicate a helical spring arranged in coaxial relation to valve stem 1. One end of spring 4 engages the valve element 2 and the other end of spring 4 engages a washer-like abutment member 5 having openings 5' for the passage of a fluid flowing in the direction of stem 1 toward a valve seat structure 6.

The pressure exerted by spring 4 upon valve element 2 results in a deformation of the latter. This has been indicated in FIG. 2. The dash-and-dot lines in FIG. 2 indicate the shape of the valve element 2 before being subjected to the axial pressure exerted by helical spring 4, which shape is the same as that shown in FIG. 1. The solid lines of FIG. 2 indicate the shape of valve element 2 upon having been subjected to the axial pressure of spring 4.

When the unit of FIG. 2 is mounted in a valve or regulator housing as shown in FIG. 3, abutment member 5 is fixedly supported by the housing in a position such as that shown in FIG. 3. As a result, spring 4 is compressed, and portion 2' of valve element 2 is pressed by the action of spring 4 against the valve seat 6. The action of spring 4 is sufficiently strong to cause formation of a permanent sealing shoulder in the valve-seat-engaging portion 2' of valve element 2 by penetration of valve seat 6 into valve-seat-engaging portion of valve element 2, and the resulting cold flow of said valve-seat-engaging portion 2' of valve element 2.

The formation of a permanent sealing shoulder by the valve-seat-engaging portion 2' of valve element 2 is the result of the physical or mechanical characteristics of the material of which valve element 2 is made, particularly its cold flow or creep properties. Substituting another material that does not behave like PTFE for PTFE would result in failure of the valve structure. The valve would leak if the valve body 2 were of Nylon rather than of PTFE, or its mechanical equivalent. The valve would be entirely inoperative if its valve element 2 were made of some synthetic rubber, e.g. Buna, rather than of PTFE, or a mechanical equivalent thereof. PTFE once deformed has a much smaller recovery than synthetic rubbers. The latter are more resilient than PTFE or, in other words, synthetic rubbers have a "good memory" which causes them to reassume their original shape once the force by which they were deformed subsides. A shoulder such as shown in FIG. 3 could be formed in a relatively resilient material as, for instance, synthetic rubber, but upon lowering of the valve element and valve stem unit 1,2 away from the valve seat 6 the size of the shoulder would change, and the shoulder might disappear if the pressure of spring 4 is not sufficient to overcome a pressure, or force, acting in the direction of the arrow P of FIG. 3 so that parts 2' and 6 are caused to part entirely.

If it is desired to take advantage of the chemical resistance of PFTE valve element 2 ought to be made of PTFE rather than a mechanical equivalent thereof whose cold flow properties are comparable to that of tin solder.

The diameter of the portion 1''' of valve stem 1 is less than the diameter of the portion 1'' of valve stem 1, or the major diameter of the screw-thread cut into said portion, to make it possible to more conveniently mount valve element 2 on valve stem 1.

In valves or pressure regulators involving very high fluid pressures the valve element 2 should preferably be made of glass-filled PTFE, the glass content of which may vary between 15 percent and 25 percent without adversely affecting the mechanical properties required for valve element 2.

The portion 1' of valve stem 1 may be engaged by the diaphragm of a pressure regulator as shown more in detail in my above referred-to copending patent application. The force indicated in FIG. 3 by the vector P may be that of a pressure regulator calibrating spring, as likewise shown in my above referred-to copending patent application.

In the structure of FIG. 3 movement of valve stem 1 relative to valve element 2 under the action of force P is precluded solely by the shape of valve stem 1 and valve element 2 and the physical properties of PTFE, and without provision of additional adhesive bonding means. The relatively wide diameter of portion 1' of valve stem 1 increases the strength of the mechanical connection between parts 1 and 2 in respect to axial forces in the direction of arrow P. The fact that the engaging surfaces of stem 1 and valve body 2 are smooth, and lack a screw-thread in the area where the valve element is of reduced diameter and has the shape of a frustum of a cone is another factor tending to increase the strength of the mechanical connection between parts 1 and 2 inasmuch as the relative weakening of valve element 2 by screw-threads is limited to a portion 2'' thereof which is of relatively large diameter. It is important not to provide any screw-threads at the interface between portion 1' of valve stem 1 and portion 2' of valve element 2.

I claim as my invention:

1. A valve including
   a. a valve seat;
   b. a valve stem having a portion of relatively large diameter positioned relatively close to said valve seat and a screw-threaded portion of relatively small diameter positioned relatively remote from said valve seat;
   c. a valve element with internal boring therethrough supported coaxially about said valve stem, said valve element having a valve-seat-engaging portion substantially in the shape of a frustrum of a cone positioned relatively close to said valve seat and being radially expanded by said relatively large diameter portion of said valve stem, and said valve element having a cylindrical portion positioned relatively remote from said valve seat with the internal boring therethrough of lesser diameter than the major diameter of said screw-threaded portion of said valve stem in mating engagement therewith, said valve element consisting of a synthetic substance having substantially the same mechanical properties as polytetrafluoroethylene; and
   d. a spring biasing said valve-seat-engaging portion of said valve element into engagement with said valve seat and exerting a sufficiently high force upon said valve element to cause formation of a permanent sealing shoulder in said valve-seat-engaging portion of said valve element by penetration of said valve seat into said valve-seat-engaging portion of said valve element and the resulting cold flow of said valve-seat-engaging portion of said valve element.

2. A valve as specified in claim 1 wherein said valve stem includes a portion projecting axially outwardly from said valve element at the side thereof remote from said valve seat and having a smaller diameter than the major diameter of the screw-thread on said screw-threaded portion of said valve stem, and wherein the surface of said relatively large diameter portion of said valve stem is smooth and lacks any screw-thread at the interface thereof with said valve element.

3. A valve as specified in claim 1 including means exerting a force on the end of said valve stem adjacent said valve seat opposite to the force of said spring, and wherein movement of said valve stem relative to said valve element under the action of said forces is precluded solely by the shape of said valve stem and said valve element and the physical properties of polytetrafluoroethylene and without provision of additional adhesive bonding means.

4. A valve including
   a. a valve seat;
   b. an elongated valve stem having an externally smooth-surfaced portion therealong and an externally screw-threaded portion therealong;
   c. a valve element with internal boring therethrough supported coaxially about said valve stem and in mating engagements with said portions of said stem, said valve element having a valve-seat-engaging portion positioned relatively close to said valve seat for seating and unseating therewith, the internal boring of said valve element at the side of engagement with said screw-threaded portion being lesser diameter than the major diameter of said screw-threaded portion and at the side of engagement with said smooth-surfaced portion being radially expanded to the diameter of said smooth-surfaced portion, said valve element consisting essentially of polytetrafluoroethylene; and
   d. a spring biasing said valve-seat-engaging portion of said valve element into engagement with said valve seat and exerting a sufficiently high force upon said valve element to cause formation of a permanent sealing surface on said valve-seat-engaging portion of said valve element by cold flow of said valve-seat-engaging portion of said valve element in relation to said valve seat.

* * * * *